(12) United States Patent
Suumäki et al.

(10) Patent No.: US 6,968,190 B1
(45) Date of Patent: Nov. 22, 2005

(54) TRANSFER OF OPTIMIZATION ALGORITHM PARAMETERS DURING HANDOVER OF A MOBILE STATION BETWEEN RADIO NETWORK SUBSYSTEMS

(75) Inventors: Jan Suumäki, Tampere (FI); Hans Kallio, Tampere (FI); Kalle Ahmavaara, Helsinki (FI); Juha Kalliokulju, Vesilahti (FI); Ari Tourunen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 531 days.

(21) Appl. No.: 09/716,629

(22) Filed: Nov. 20, 2000

Related U.S. Application Data

(60) Provisional application No. 60/167,924, filed on Nov. 29, 1999.

(51) Int. Cl.$^7$ ............................. H04Q 7/00; H04Q 7/20
(52) U.S. Cl. .................... 455/436; 455/432.2; 455/439; 370/331
(58) Field of Search ................................ 455/456, 452, 455/453, 452.1, 452.2, 436–440, 442, 432.1, 455/432.2; 370/331, 466–467

(56) References Cited

U.S. PATENT DOCUMENTS

| | | | |
|---|---|---|---|
| 6,292,667 B1 * | 9/2001 | Wallentin | 455/458 |
| 6,317,598 B1 * | 11/2001 | Wiesen | 455/433 |
| 6,337,989 B1 * | 1/2002 | Agin | |
| 6,374,112 B1 * | 4/2002 | Widegren | 455/452 |
| 6,438,370 B1 * | 8/2002 | Einola | 455/422 |
| 6,445,917 B1 * | 9/2002 | Bark et al. | 455/423 |
| 6,466,556 B1 * | 10/2002 | Boudreaux | 370/331 |
| 6,501,953 B1 * | 12/2002 | Braun | 455/456 |
| 6,504,828 B1 * | 1/2003 | Corbett | 370/331 |
| 6,539,237 B1 * | 3/2003 | Sayers et al. | 455/555 |
| 6,580,699 B1 * | 6/2003 | Manning | 370/331 |
| 6,580,910 B1 * | 6/2003 | Mazur | 455/440 |
| 6,594,242 B1 * | 7/2003 | Kransmo | 370/331 |
| 6,628,671 B1 * | 9/2003 | Dynarski et al. | 370/469 |
| 6,725,038 B1 * | 4/2004 | Subbiah | 455/436 |
| 6,771,964 B1 * | 8/2004 | Einola et al. | 455/437 |
| 6,876,640 B1 * | 4/2005 | Bertrand et al. | 370/331 |

FOREIGN PATENT DOCUMENTS

| | | |
|---|---|---|
| EP | 0 836 338 A2 | 4/1998 |
| EP | 1 058 471 A2 | 12/2000 |
| WO | 9909774 | 2/1999 |
| WO | 9951051 | 10/1999 |
| WO | WO 0036860 | 6/2000 |
| WO | WO 00/49784 | 8/2000 |
| WO | WO 01/20938 A1 | 3/2001 |

OTHER PUBLICATIONS

TS 25.331 v1.1.0 (Jun. 1999), 3rd Generation Partnership Project (3GPP); Technical Specification Group (TSG) RAN; Working Group 2 (WG2), RRC Protocol Specification.

ETSI TS 101 297 v6.4.0 (Aug. 1999), Digital Cellular Telecommunications System (Phase 2+); General Packet Radio Service (GPRS); Mobile Station (MS) -Serving GPRS Support Node (SGSN); Subnetwork Dependent Convergence Protocol (SNDCP) (GSM 04.65 v 6.4.0 Release 1 1997).

(Continued)

Primary Examiner—William Trost
Assistant Examiner—Brandon J. Miller

(57) ABSTRACT

Instead of renegotiating parameters relating to an optimization algorithm previously negotiated between a mobile station and a target radio network subsystem during connection handover of the mobile station from a source radio network subsystem, prestored parameters are transferred instead between the source radio network subsystem and the target radio network subsystem either directly over an existing Iur interface or via a core network over an Iu interface.

20 Claims, 14 Drawing Sheets

OTHER PUBLICATIONS

3G TS 23.121 v3.0.0 (Jul. 1999), 3rd Generation Partnership Project; Technical Specification Group Services and Systems Aspects; Architectural Requirements for Release 1999 (3G TS 23.121 v 3.0.0).

3G TS 23.121 v3.1.0 (Oct. 1999); 3rd Generation Partnership Project; Technical Specification Group Services and Systems Aspects; Architectural Requirements for Release 1999 (3G TS 23.121 v 3.1.0).

3G TS 23.060 v 3.4.0 (Jul. 2000); 3rd Generation Partnership Project; Technical Specification Group Services and System Aspects; General Packet Radio Service (GPRS); Service Description; Stage 2 (Rel 1999.

* cited by examiner

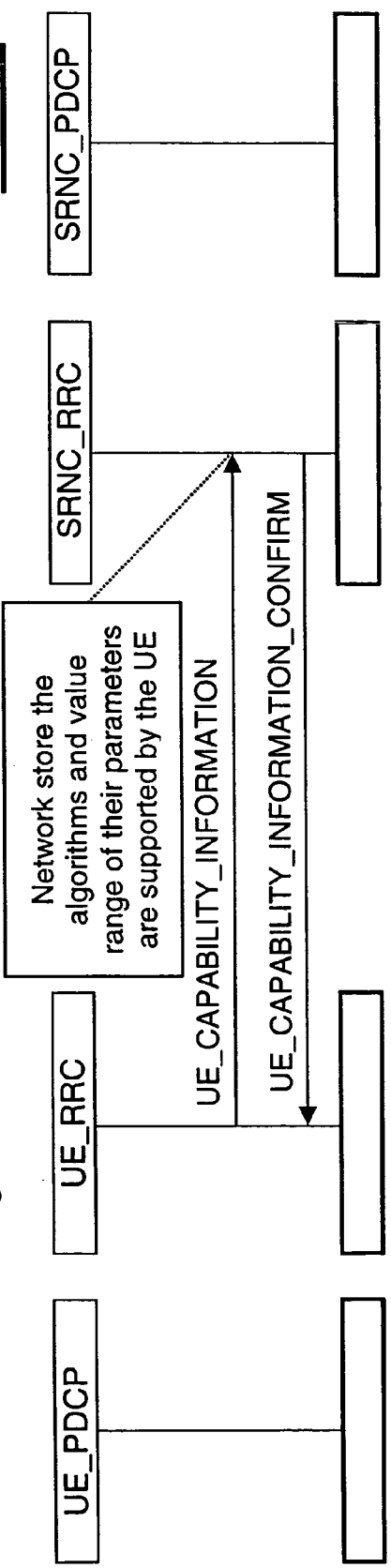
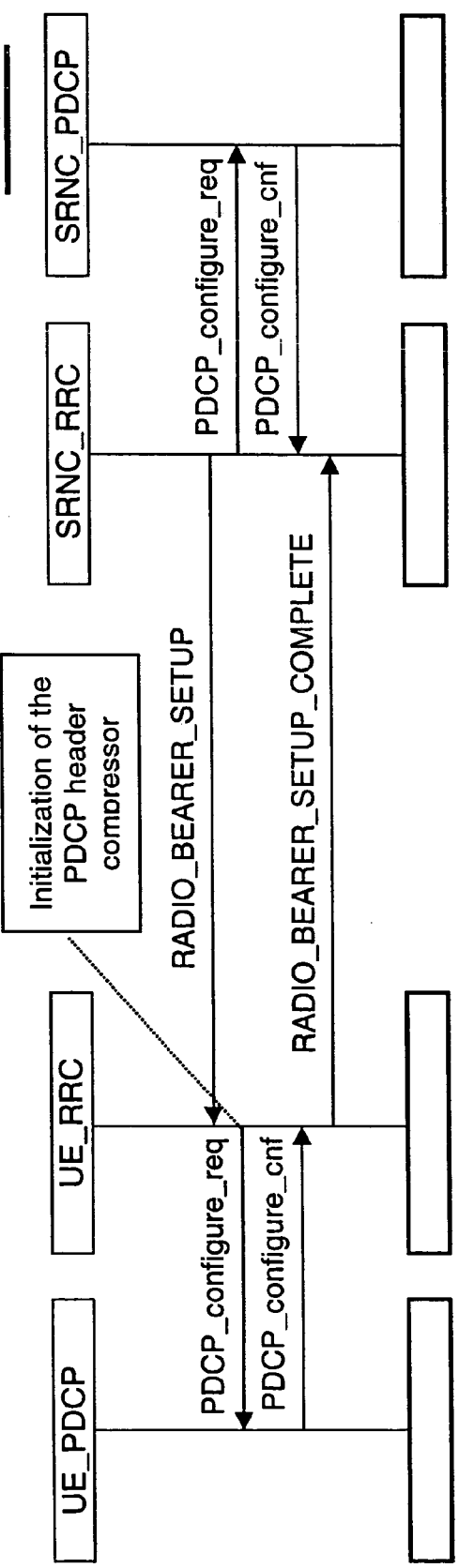

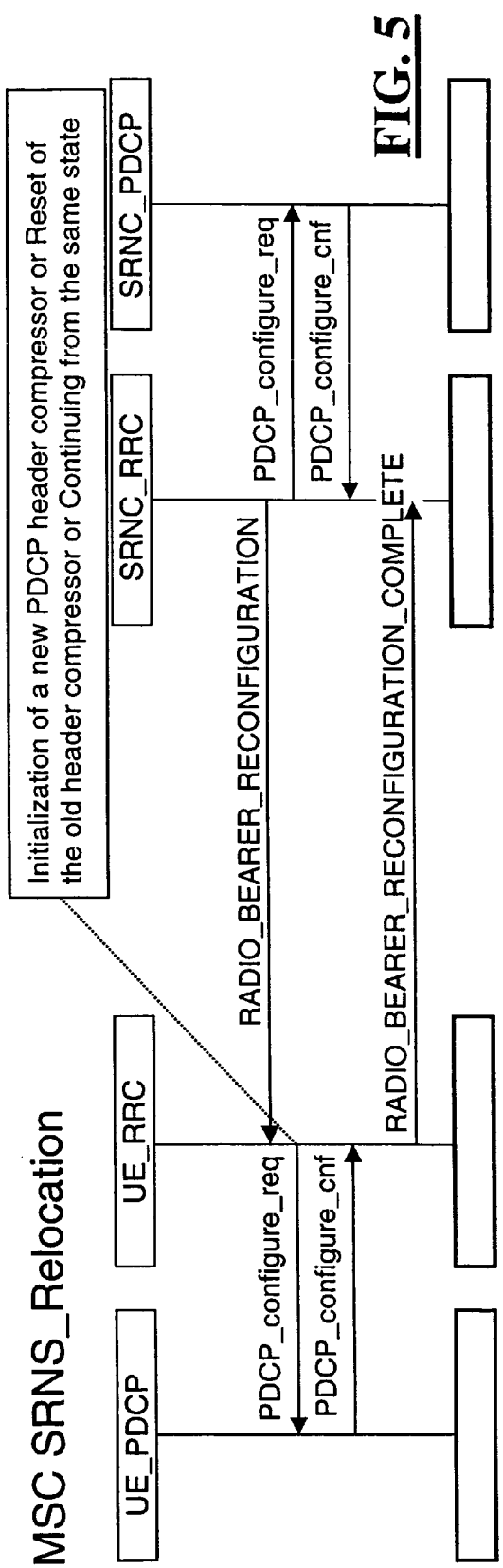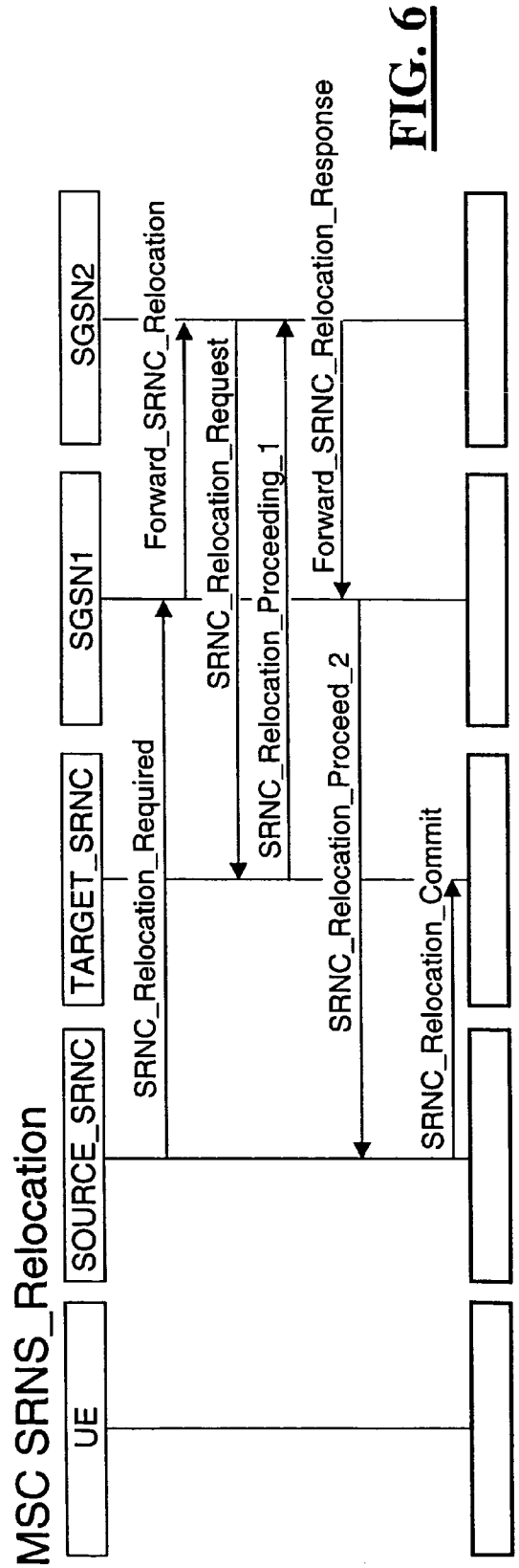

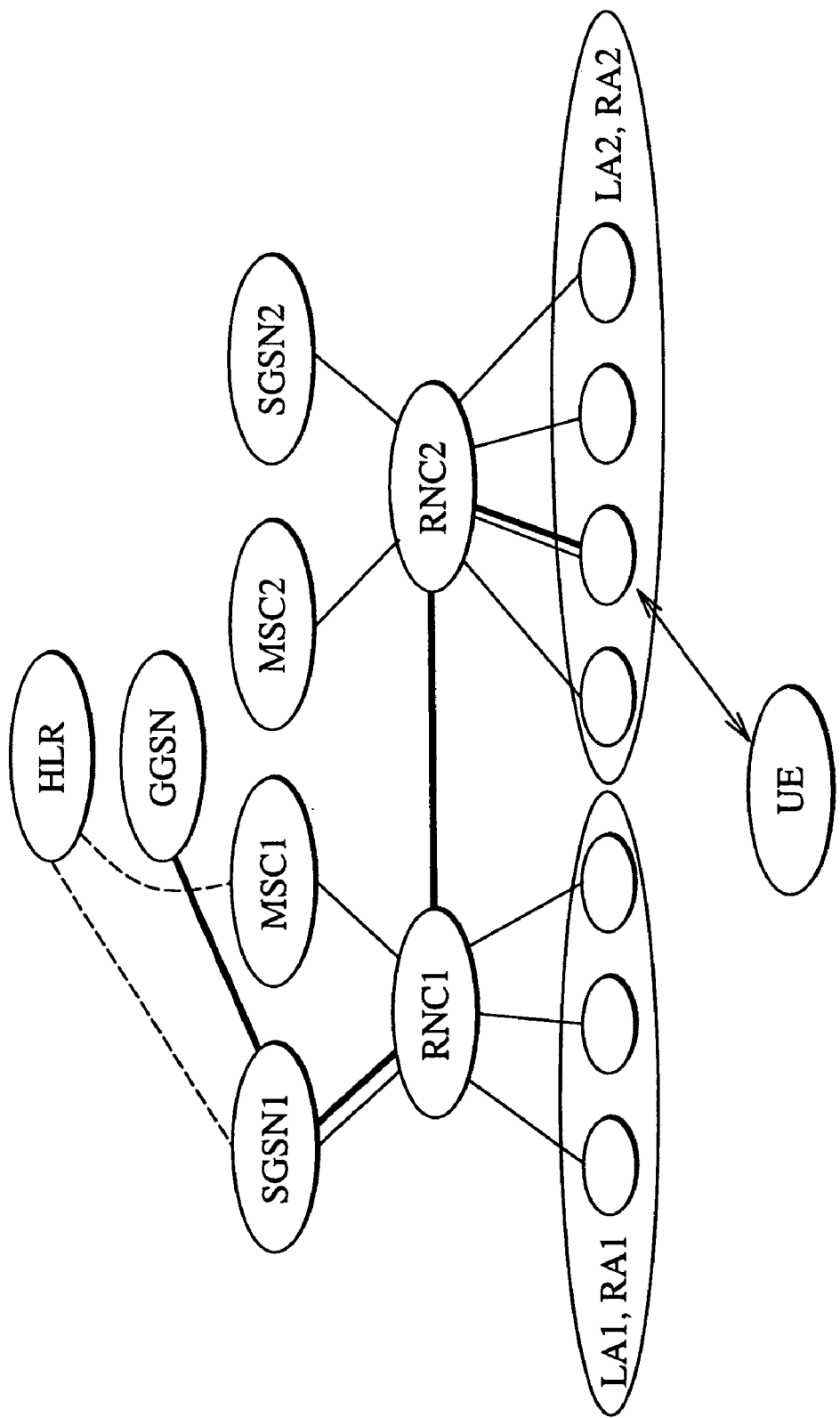
FIG. 7 (Before the SRNS relocation and location registration)

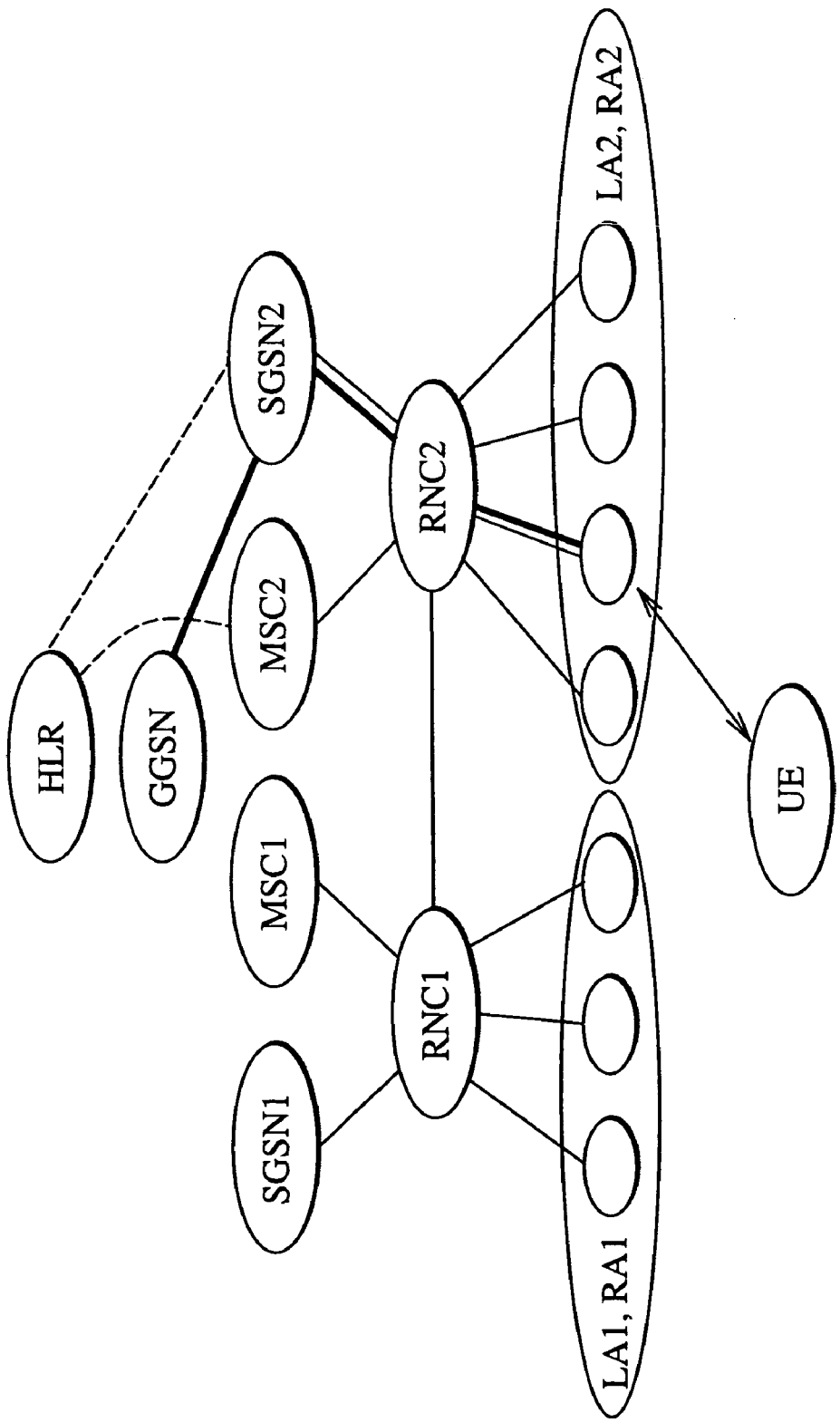
FIG. 8 (After the SRNS relocation and location registration)

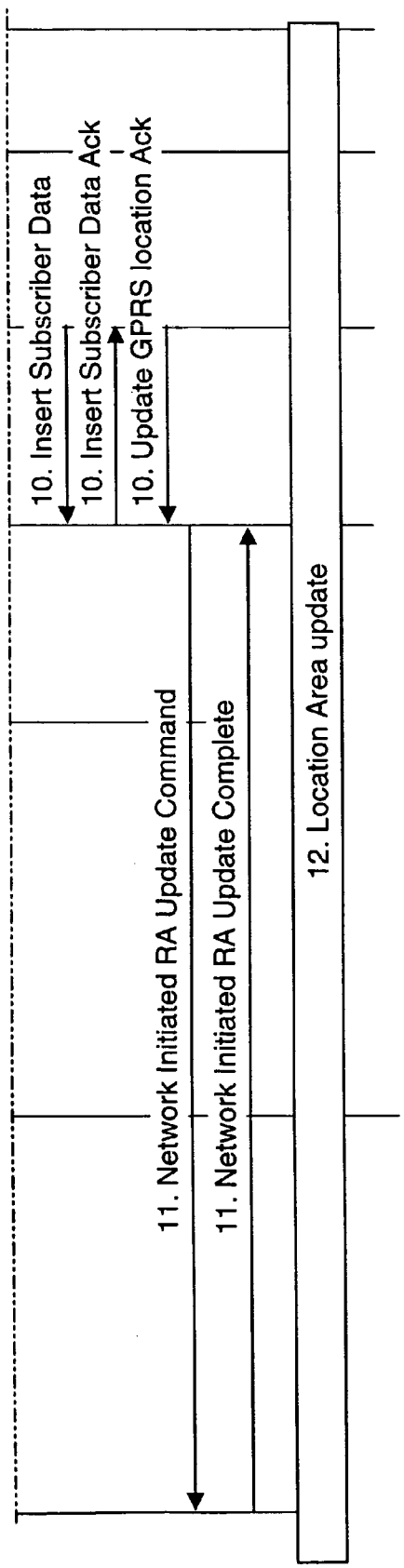
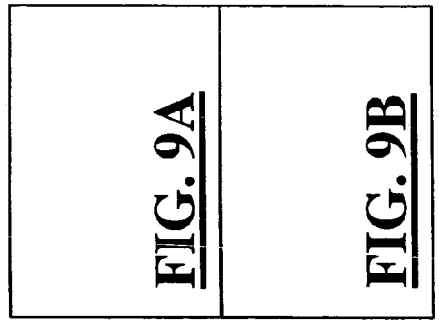
FIG. 9B (Interface information transfer for SRNS relocation update when changing SGSN area resulting in a change of registration location and followed by location registration in new Location Area)
FIG. 9

FIG. 10 (Data paths before the SRNS relocation has been actually committed (before point (a) in Figure 9))

FIG. 11  Data paths after the GGSN update (after point (c) in Fig. 9)

FIG. 12 Data paths after the resource release in source RNC (after point (d) in Figure 9))

(GPRS network architecture)

(UMTS packet network architecture)

(Two logical RNCs)

Node Bs

TRANSFER OF OPTIMIZATION ALGORITHM PARAMETERS DURING HANDOVER OF A MOBILE STATION BETWEEN RADIO NETWORK SUBSYSTEMS

This application claims benefit of U.S. Provisional application 60/167,924 filed Nov. 29, 1999.

TECHNICAL FIELD

2nd and 3rd generation cellular packet systems.

BACKGROUND OF THE INVENTION

In the Global System for Mobile Telecommunications/General Packet Radio Service (GSM/GPRS) network architecture, as shown in FIG. 13, there are known data protocol stacks associated the various architectural elements, including the mobile station (MS), base station subsystem (BSS) including Base Transceiver Station (BTS) and Base Station Controller (BSC), serving GPRS support node (SGSN) and gateway GPRS support node (GGSN). The MS and the SGSN share peer logical link control (LLC) and subnetwork-dependent convergence protocol (SNDCP) layers in the user plane.

A typical GPRS negotiation that is required between peer entities in the mobile station and some of the fixed network devices is the exchange identification or XID negotiation, where so-called L3CE (layer 3 compatibility entity) parameters are agreed upon.

The UMTS packet network architecture is highly similar to GPRS. However, the naming of some elements and interfaces has been changed from GPRS. While FIG. 13 shows the GPRS network architecture, FIG. 14 shows the UMTS packet network architecture.

The UMTS packet network consists of the following network elements:

Node B: corresponds to Base Transceiver Station (BTS) in GSM.
RNC (Radio Network Controller): corresponds to Base Station Controller (BSC) in GSM.
3G-SGSN: the $3^{rd}$ Generation version of the Serving GPRS Support Node (SGSN) of GSM/GPRS.
3G-GGSN: the $3^{rd}$ Generation version of the Gateway GPRS Support Node (GGSN).
HLR: the GSM Home Location Register (HLR) with some updates.

As shown in FIG. 14, Node B and RNC comprise the RAN part of the UMTS network. RAN corresponds to GSM's BSS. The responsibility of RAN is the handling of all radio specific functions, e.g., radio channel ciphering, power control, radio bearer connection setup and release. The basic separation between elements is that Node B handles the physical layer functions and RNC handles the management functions. However, the separation might ultimately turn out to be slightly different than in GSM/GPRS.

The biggest architectural difference is the new interface, Iur, inside RAN. It is resident between RNCs. UMTS introduces a new concept called macrodiversity. In a macrodiversity situation, data is sent via multiple Node Bs. Because signals are transferred via multiple routes over the air interface and combined in the MS and the RNC, e.g., the fading effect is less harmful and thus lower power levels can be used. However, those Node Bs may belong to the area of two or more different RNCs, so the interface, i.e., Iur-interface between RNCs is required. In this situation, as shown on the right in FIG. 15, RNC can be in two logical roles. RNC can be logically either:
 drift RNC (DRNC) or
 serving RNC (SRNC).

The actual termination point of the Iu-interface is at the SRNC. The Iu-interface shown in FIG. 14 connects the Radio Access Network (RAN) and Core Network (CN) for packet-switched or circuit switched services. The SRNC controls information transfer and requests radio resources from appropriate DRNCs. The DRNC only relays information between MS and SRNC.

The Core Network (CN) part of the packet-switched side consists of 3G-SGSN, 3G-GGSN and HLR elements, as shown in FIG. 14. The Packet Core Network (CN) also includes the IP-based backbone network. The backbone connects core network elements, e.g., 3G-SGSN and 3G-GGSN together.

3G-SGSN participates in routing of user packets as well as mobility and session management functions. The Mobility Management (MM) layer knows "who you are (security) and where you are (mobility)". The Session Management (SM) layer controls the user connections, i.e., sessions.

3G-GGSN maintains the location information of 3G-SGSN, which serves the mobile station to which a packet is targeted. The main function of 3G-GGSN is to perform interworking functions between the UMTS network and the external data network, e.g., the Internet. These interworking functions include, e.g., the mapping of the external QoS to a comparable UMTS QoS.

HLR stores the subscriber data and holds the information to which 3G-SGSN the user is connected. The subscriber data includes predefined QoS attributes for the user connections, among other things.

The UMTS packet data protocol stack has some major modifications compared to GPRS, partly due to the new radio interface technology (WCDMA) and partly due to much higher QoS requirements.

One of the most important changes is that Logical Link Control layer (LLC) of ESM/GPRS has been removed below the Layer 3 Compatibility Entity (L3CE). L3CE corresponds to SubNetwork Dependent Convergence Protocol (SNDCP) protocol in GPRS. The main tasks of the LLC protocol have been:
 flow control between MS and core network,
 ciphering,
 signaling message transfer,
 multiplexing of different QoS and
 retransmission between MS and the core network.

In UMTS, LLC is not needed due to the following reasons: 1) Ciphering has been decided to take place in lower layers, inside RAN. 2) Signaling message transfer does not use user plane protocols, because there are separate protocols for transferring signaling messages and thus the differentation between the user plane and the control plane is clearer than in GPRS.

In the UMTS radio interface, each radio bearer will have its own Radio Link Control (RLC) entity. By applying this approach the QoS provisioning is more efficient. The QoS related multiplexing will be a task for the Medium Access Control (MAC) layer and Layer 1 (L1) and thus LLC would not have any role in QoS multiplexing in UMTS. The retransmission between the MS and the core network cannot be easily justified. The main source of the errors is the radio interface, and RLC has the responsibility to correct those errors.

However, the removal of LLC will cause a lack of flow control between the MS and the core network. The flow control in the uplink is not a problem, because the radio interface will be the bottleneck and flow control of RLC takes care of it. In the downlink, RLC will handle the RNC—MS part. Between RNC and the core network, there is no flow control. But this is not a much worse situation than in GPRS, because GPRS does not have any flow control inside the core network (between GGSN and SGSN).

Adequate data transfer between 3G-GGSN and RNC relies on large enough buffers, traffic policing in 3G-GGSN and end-to-end flow control, e.g., Transmission Control Protocol (TCP). In general, the removing of LLC streamlines the protocol stack and makes it easier to achieve higher data rates and reduces required processing power.

The location of the UMTS counterpart to L3CE (SNDCP in GPRS) called Packet Data Convergence Protocol (PDCP) is under consideration. Unlike in GPRS the PDCP layer is located in RNC instead of SGSN. The protocol inter alia takes care of optimization, e.g., by header compression, which is a form of optimization algorithm. Some header compression algorithms are based on the principle that disappearance of a few packets may cause undesirable additional packet loss due to the algorithm itself. This degrades packet transfer because more retransmissions are needed to be done. By locating it to the RNC, the retransmission time is short and the TCP level retransmission (due to TCP timers) can be avoided.

Network layer protocols are intended to be capable of operating over services derived from a wide variety of subnetworks and data links. The PDCP supports several network layer protocols providing protocol transparency for the users of the service. An introduction of new network layer protocols to be transferred over PDCP should be possible without any changes to other UMTS protocols. Therefore, all functions related to transferring of Network Layer Protocol Data Units (N-PDUs) are carried out in a transparent way by the network entities. Another requirement for PDCP is to provide functions that improve data and channel efficiency. This is done by different kind of optimization algorithms or methods, e.g., the above-mentioned header compression.

UMTS (Universal Mobile Telecommunications System), as shown in FIG. 14, utilizes similar protocol structures and negotiation arrangements for communication between mobile stations, Radio Network Controllers (RNCs) and service nodes of packet-switched networks, with some modification. Exchange Identification (XID) negotiation is carried out by the PDCP but is called PDCP parameter negotiation and can be viewed generally as a transfer of optimization algorithm parameters.

In either case, the negotiated parameters will relate to such optimization algorithm parameters, for example, to the use of headers and data compression. The GSM/GPRS method for arranging an XID negotiation is to insert the proposed parameters into certain messages in an LLC protocol layer and to use corresponding LLC-level answering messages to either acknowledge or reject the proposed SNDCP parameters.

The XID negotiation is usually made when SNDCP and LLC in GPRS are initialized (values for XID parameters are no longer valid). This initialization is made, e.g., when the MS is powered on or the location of network side protocols changes in handover.

The main problem of the currently-proposed XID negotiation method for UMTS is that the location of PDCP is different from the location of SNDCP and LLC protocol. PDCP locates in the radio access network while comparable GPRS protocols locate in core networks. This means that the location of PDCP changes far more often than the locations of SNDCP and LLC. Because XID messages may be relatively large, this adds much more overhead to the air interface in UMTS than in GPRS.

Another problem is that UMTS has also real time packet connections. This means that negotiations such as XID should be as fast as possible, because otherwise it may cause delays or at least more overhead in the air interface (header compression cannot be used after handover until XID negotiation is successfully made).

SUMMARY OF INVENTION

The object of the invention is to provide for improved UMTS as well as GSM/GPRS negotiation methods.

This invention improves any negotiation, such as optimization algorithm parameter negotiation, e.g., XID negotiation, by reducing the overhead over the air interface and making the negotiation procedure faster. The basic idea of the invention is that during handover, parameters such as XID, containing parameter information about optimization methods to be supported, are transferred from the old entity to the new entity on the network side. If the parameters were appropriate in the new entity, the actual negotiation between the MS and the network is not needed, thus saving resources on the air interface. This method is also considerably faster than, for instance, normal XID negotiation.

According to the present invention, a method of negotiating such as negotiating optimization algorithm parameters, for instance exchange identification (XID) parameters during connection handover of a mobile station between radio network subsystems, comprises the steps of signaling from a source radio network subsystem to a core network or to a target radio network subsystem that said handover is required, signaling from the core network or from the target radio network subsystem to the source radio network subsystem that said handover is to proceed, and transmitting said parameters from said source radio network subsystem to said target radio network subsystem directly or via the core network without any need for renegotiating over an air interface between said mobile station and said target radio network subsystem.

In further accord with the present invention, wherein during initial establishment of said connection between the mobile station and the source radio network subsystem, the optimization algorithm paramaters such as exchange identification parameters may include various optional sets of parameters, only one of which is accepted by the source radio network subsystem, said method further comprising the step of storing all of said optional sets of parameters wherein said step of transmitting said parameter includes transmitting all of said optional sets of parameters.

From the foregoing, it will be realized that the present invention indeed saves resources for the air interface and makes any kind of negotiation, including negotiation of parameters relating to optimization methods such as XID faster, which is advantageous for real time connections.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 shows an MSC connecting to the network.

FIG. 4 shows MSC initialization.

FIG. 5 shows MSC SRNS relocation.

FIG. 6 also shows MSC SRNS relocation.

FIG. 7 shows a situation before SRNS relocation and location registration.

FIG. 8 shows the situation after the SRNS relocation and location registration.

FIG. 9 shows how FIGS. 9A and 9B fit together.

FIGS. 9A and 9B together show the signaling sequence concerning interface information transfer for SRNS relocation update when changing SGSN area resulting in a change of register location and followed by location registration in a new location area.

BEST MODE FOR CARRYING OUT THE INVENTION

The first XID negotiation after the MS is connected to the network is always a normal GPRS type of XID negotiation, as in the prior art. The GPRS XID parameter negotiation as part of the SNDCP protocol is defined in TS 101 297 v.6.4.0 (1999–08) (GSM 04.65 version 6.4.0 Release 1997 (chapter 6.8)).

Similarly, during inter RNC handover (SRNS relocation), according to the currently-proposed evolution of the GSM platform towards UMTS, the control point of data transfer moves from a source RNC (RNC 1) to a target RNC (RNC 2) and thus a new PDCP entity is established to the target RNC network element. However this new PDCP entity should negotiate XID parameters, before it starts data transfer towards the MS (PDCP can transfer data before it knows negotiated XID parameters, but then it is allowed only use default values of XID parameters -> no optimization is allowed, e.g., header compression).

The prior art basic solution (as in GPRS) is still that the target RNC makes normal XID negotiation between itself and the MS and after that starts data transfer.

Figure 1:
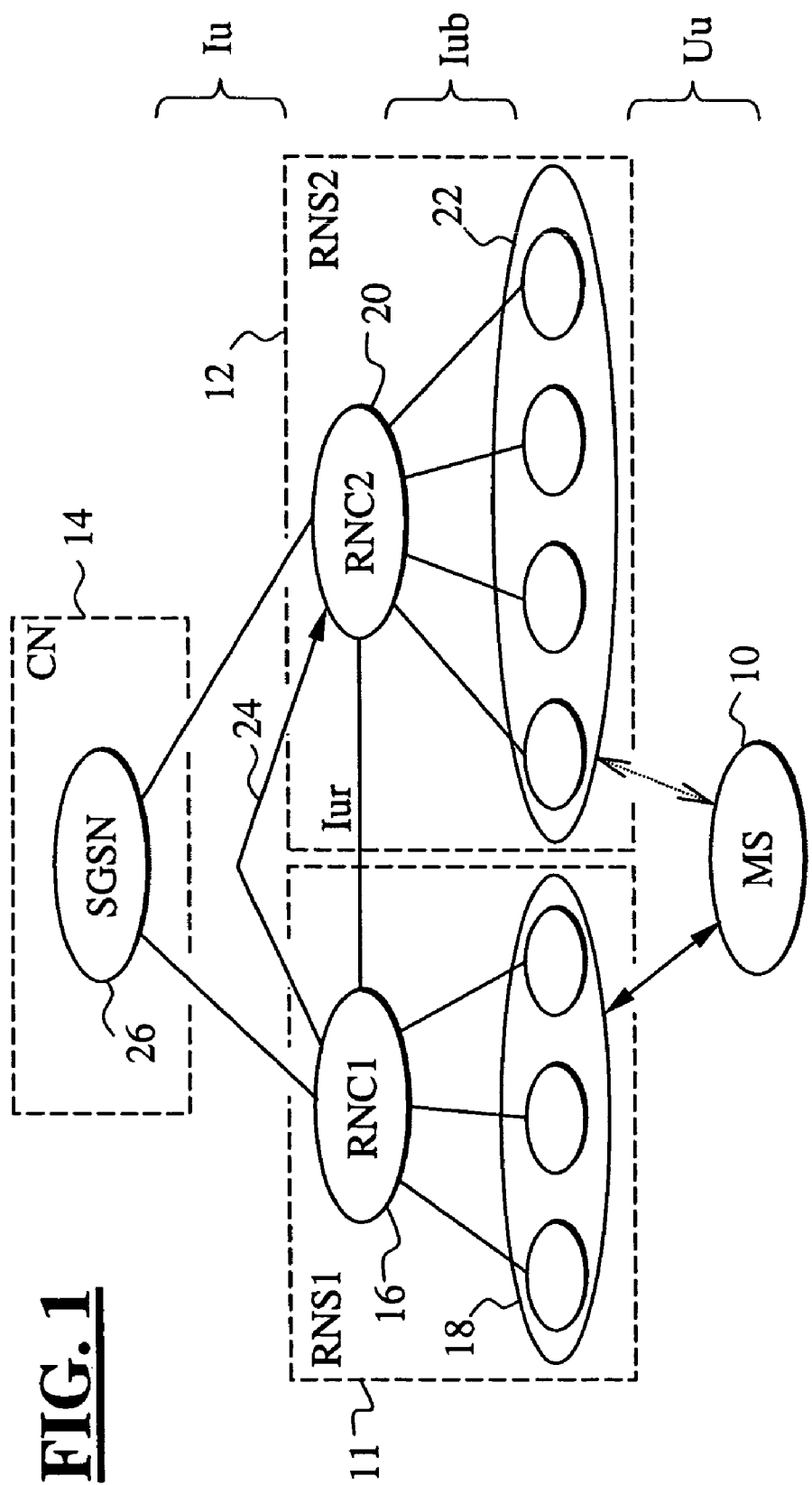
FIG. 1 shows a source radio network controller (RNC) moving already-negotiated XID parameters to a target RNC during handover, according to the present invention.

A more advantageous solution according to the present invention, and as illustrated in FIG. 1, is that the source RNC 16 (RNC 1) moves the already-negotiated XID parameters to the target RNC 20 (RNC 2) during handover, i.e., SRNS relocation directly or via SGSN 26 (see 3G TS 23.121 v3.0.0—chapter 4.3.12.2.3).

Figure 14:
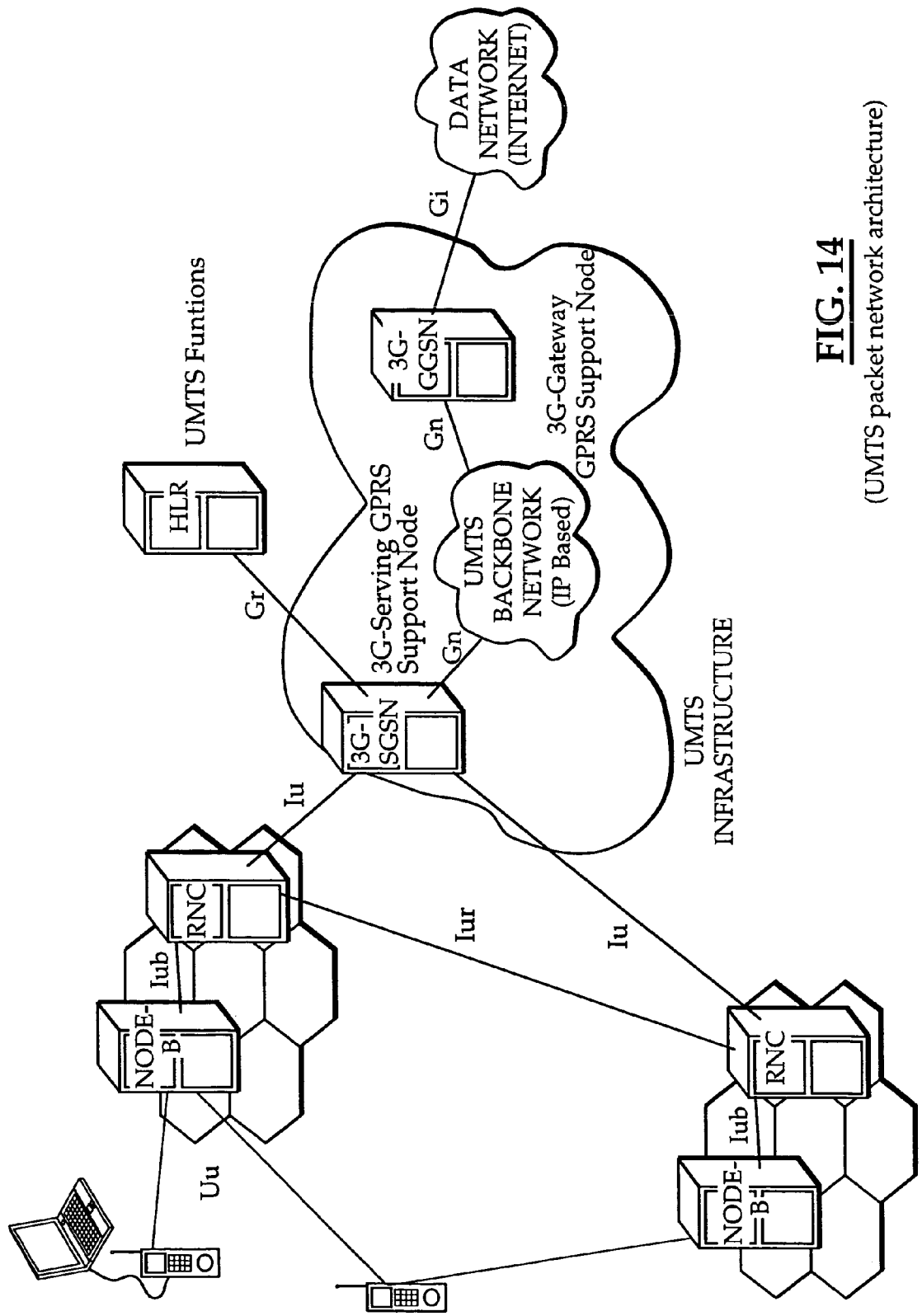
FIG. 14 shows the UMTS packet network architecture.

FIG. 1 shows a pair of radio network subsystems 11, 12 connected to the core network 14 through an Iu interface. The radio network system 11 consists of a radio network controller 16 and one or more abstract entities 18, which may be called Node B, which corresponds to the Base Transceiver Subsystem of GSM. The entities of Node B are connected to the RNC through an Iub interface. A Node B can support FDD mode, TDD mode or dual-mode operation. The RNC is responsible for handover decisions that require signaling to the mobile station 10 over a Uu interface. The RNC comprises a combining/splitting function to support macrodiversity between different Node Bs. The Node B can comprise an optional combining/splitting function to support macrodiversity inside a Node B. The RNCs 16, 20 of the radio network subsystems 11, 12 can be interconnected together through an Iur interface, as already discussed previously in connection with FIG. 14.

Figure 15:
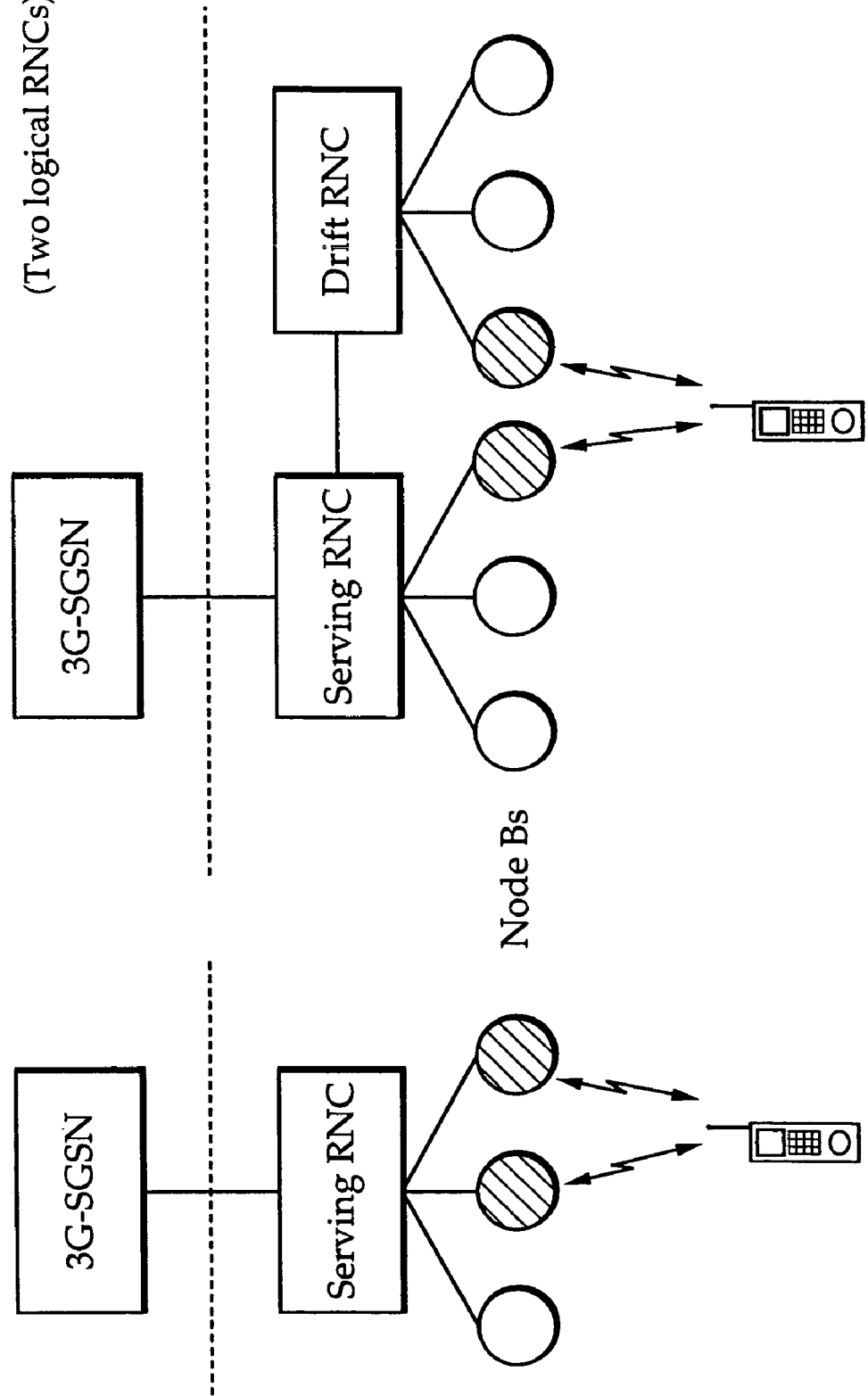
FIG. 15 shows two logical RNCs.

Each RNC is responsible for the resources of its set of cells. For each connection between a user equipment, such as the mobile station MS 10 of FIG. 1, and the illustrated access/core architecture, one RNC is the serving RNC. In FIG. 1, the RNC1 16 is initially the serving RNC. The RNC2 20 serves as a drift RNC (see also FIG. 15) and supports the serving RNC1 16 by providing radio resources for possible handover. Upon such a handover, as suggested above, during the inter-RNC handover, the control point of data transfer moves from RNC1 16 to RNC2 20 for establishing a new PDCP entity to the target RNC2 20. According to the prior art, this new PDCP entity should first negotiate PDCP parameters, before it starts data transfer to the MS, unless it wishes to only use the default values, i.e., without optimization.

According to the present invention, rather than renegotiating, such as renegotiating optimization algorithm parameters, for instance PDCP parameters all over again, the RNC1 16 transfers the already-negotiated PDCP parameters to RNC2 20, as indicated on a line 24, which transfer may take place over the Iur interface or through the core network 14, e.g., via a serving GPRS support node (SGSN) 26.

Figure 2:
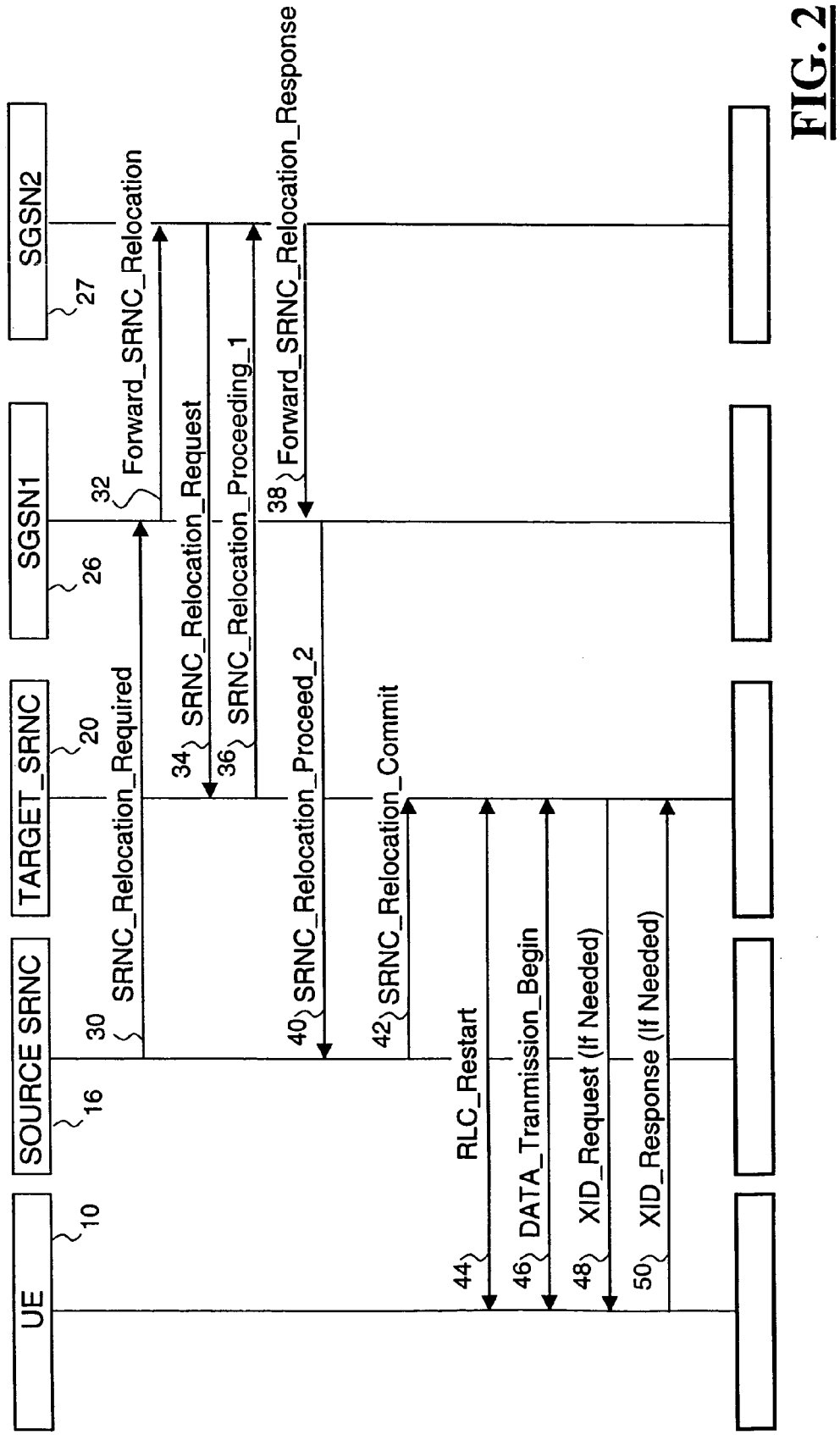
FIG. 2 shows a simplified procedure of SRNS relocation according to the present invention.

FIG. 2 shows an embodiment that represents a simplified procedure of SRNC relocation where two SGSNs are involved in the core network. One possible solution for PDCP parameter transfer is the use of SRNC relocation messages (e.g., SRNC_Relocation_Required 30, Forward_SRNC_Relocation 32 (e.g., if RNS1 and RNS2 are connected to different SGSNs, to possibly another SGSN 27 not shown in FIG. 1), SRNC_Relocation_Request 34 to the target SRNC 20, SRNC's Relocation_Proceeding 1 36, Forward_SRNC_Relocation Response 38, SRNC_Relocation_Proceed 2 40, SRNC_Relocation Commit 42, RNC_Restart_44, Data_Transmission_Begin 46, PDCP_Parameter_Request (if needed) 48, PDCP_Parameter_Response (if needed) 50). The format of PDCP parameters can be the same as in normal prior art XID negotiation. After the target RNC2 20 receives these PDCP parameters, it checks their validity. If they are valid, it can use the parameters immediately. Otherwise the target RNC makes a normal XID-type negotiation, as suggested in FIG. 2 at steps 48, 50. So PDCP negotiation between the MS and the target RNC is made only when PDCP parameters are not valid in the target RNC and therefore air resources are saved.

However, the MS requires information about the validity of the PDCP parameters before it can send data to the RNC (MS can't otherwise know whether PDCP parameters were alright in the RNC). There are two options:

Preferable solution: RNC informs the MS about validity of XID parameter during/before RLC restart within separate message, e.g., during step 44 of FIG. 2. If PDCP parameters were valid, both ends can use same negotiated PDCP parameters immediately. If PDCP parameters were not valid, PDCP negotiation is made after restart, as shown, e.g., in steps 48, 50. Until PDCP negotiation is completed, all data packets are sent in uncompressed mode, i.e., the default mode.

Another solution: It can be guaranteed, that PDCP parameter negotiation can be made before data transfer (preferably before RLC restart step 44), if it is needed. (This might cause delays to SRNC relocation, however.)

This retrieval of PDCP parameters from the source RNC, as described so far, has one disadvantage. The target RNC can't know if the MS can handle 'better' PDCP parameters, e.g., better compression methods than originally negotiated between the MS and the source RNC 16 (RNC 1).

EXAMPLE

MS can handle header compression methods A and B
RNC 1 can handle header compression method A
RNC 2 can handle header compression methods A and B.

Because PDCP negotiation is made originally by RNC 1, only header compression A is negotiated for use. After SRNC relocation, RNC 2 checks the validity of the PDCP parameters. In the example they are valid, because RNC 2 can handle header compression A. The problem is that, in this situation, PDCP negotiation between MS is not made and header compression B is not taken up for use. If the header compression B is significantly better, it causes inefficiency. (Normal PDCP negotiation takes always the best XID parameters for use.)

This problem can be avoided, according further to the invention, with the following enhancements:

Firstly, the initial XID negotiation (first XID negotiation after MS is connected to the network) is always started from the MS side. (This is a normal situation in GPRS). The MS defines and puts suitable PDCP parameters into the PDCP message. Then the peer entity, i.e., RNC, negotiates, i.e., selects appropriate PDCP parameters and sets suitable values to them. After that the RNC returns negotiated XID parameters to the MS and the negotiated parameters are taken up for use.

However, if the RNC stores in addition to negotiated PDCP parameters also the 'not used' or discarded PDCP parameters (in the example, it stores information on header compression B), when SRNC relocation is made, the 'not used' PDCP parameters are retrieved from storage and are also transferred to the target RNC. (The same SRNC relocation messages are used then on transfer or negotiated PDCP parameters.) According to this information, the target RNC can decide if those 'not used' XID parameters are 'better' (in the example, header compression B) than currently negotiated and make PDCP negotiation between MS to take up for use new and 'better' XID parameters.

A few examples of Negotiation of Header Compression (HC) parameters according to the invention will now be given.

Example 1

An example of negotiation of header compression (HC) parameters is shown in FIG. 3. When Mobile Station connects to the network RRCs with a UE CAPABILITY INFORMATION message is used to inform the SRNC of the header compression (HC) methods that UE is able to use and the parameters thereof. This information is left to the network to be updated and taken care of.

After comparing the network's own and these received parameters, the network makes a decision of the HC-method to be used, also taking into consideration the QoS requirements. Thus it is possible to choose the most probable HC method (in other words, according to QoS requirements the first configured method can be chosen to be real-time traffic optimized method or not). After the network has made the decision it configures its own compressor, generates the OPT value table and commands using RRC messages RADIO BEARER SETUP (FIG. 4) or RADIO BEARER RECONFIGURATION (FIG. 5) the parameters relating to that algorithm with which the compressor in the UE end is configured. At the same time the OPT table is generated to match the table of the network's end. The VE_RRC responds with a RADIO_BEARER_SETUP_COMPLETE (FIG. 4) message to the SRNC_RRC or with a RADIO_BEARER_RECONFIGURATION_COMPLETE (FIG. 5) message in case of reconfiguration.

Because the network knows (FIG. 3) which algorithms the UE and the network itself are able to use, it is possible to configure a new compressor in case other kinds of packets (different from what is supported by current compressor) are recognized and the compression of these is supported by the network and the UE. In that case, new compressors will be configured at both ends immediately. If the notification is in the UE end, these are sent firstly to the RNC uncompressed and after the RNC notices the situation it configures the compressors at both ends. The new compressor at the UE end is configured using a RADIO BEARER RECONFIGURATION (FIG. 5) message containing the information, which is sent when the new method is being configured.

Because the network maintains the information of all possible methods for use at both the UE and the network and because only the most probable method is being configured, it is possible to leave the compressors of other methods to be configured later if needed.

In case of SRNS relocation, as detailed in FIG. 6, after the last SRNC_relocation_Commit message, a new RNC RADIO BEARER RECONFIGURATION (FIG. 5) message is sent, wherein new HC parameters are communicated if the method changes. In case the method doesn't change, only old parameters are communicated and information about the reset (yes/no) of the compressor is transmitted. If there is no resetting then the compression/decompression continues as it was in the old RNC.

Example 2

Again, when the Mobile Station connects to the network RRCs with the UE CAPABILITY INFORMATION message of FIG. 3, the SRNC_RNC is informed of the desired header compression (HC) methods that the UE is able to use and the related parameters. This information is left to the network to be updated and taken care of.

The network chooses the methods that can be supported based on its own supported methods as well as those of the UE. After this the network could send the parameters of all the supported methods at the same time with a message to the UE. This would mean that both the network and the UE would know which methods can be supported. In this case also the OPT table indicating different packet types of different methods is generated to be similar at both ends. This information transfer can be carried out by using RRC's RADIO BEARER SETUP, as shown in FIG. 4, or RADIO BEARER RECONFIGURATION messages, as shown in FIG. 5. At the same time the most probable method is informed and configured and the compressor is created.

In case the configured compressor is, e.g., TCP/IP but afterwards RTP/UDP/IP real-time packets are recognized, PDCP recognizes the situation and generates a new compressor for those. This new RTP/UDP/IP compressor is configured and inside the compressor the stream-based contexts are generated and stream-based Full Headers (FH) are sent to the other end. The link layer informs using the OPT-field about what compression method is in question and that it deals with that method's Full Header (FH). The other end notices the situation, configures the decompressor and generates (using FHs) the correct internal contexts for existing streams. In this situation no RADIO BEARER RECONFIGURATION messages need to be sent. After this the compressor is able to send compressed packets without further acts. This solution works independently of the transmission end (UE/network).

Another solution is that for all supported methods each end's own compressors are configured immediately in the beginning, meaning that compressor configuration is done only once. In this case inside the compressor only the own specific stream-based contexts are generated and stream-based Full Headers (FH) are sent to the other end. Also if the same compressor supports two methods the configuration is not needed but only one's own stream-based compressor contexts are generated and FHs sent to the other end.

Again, in SRNS relocation after SRNC_relocation_Commit message, as shown in FIG. 6, a new RNC RADIO BEARER RECONFIGURATION message is being sent (FIG. 5), wherein the UE is informed if the method changes. In case the method doesn't change only information about the reset (yes/no) of the compressor is sent. If there is no resetting then the compression/decompression continues as it was in the old RNC.

Example 3

It is also possible that network informs the UE about the methods it supports when connecting to the network and in case of SRNS relocation after SRNC_relocation_Commit message. In this case UE begins the transmission of compressor parameters using some RADIO BEARER SETUP (FIG. 4) and RADIO BEARER RECONFIGURATION (FIG. 5) based signaling and the compressor generating procedure according to example 1 or 2 with the difference that UE sends the configuration messages and network receives them.

The current (prior art) solution in GPRS is that XID negotiation is made again when the location of SGSN changes (inter SGSN handover). This negotiation is required, because the SNDCP and LLC protocols locate in SGSN and the old XID parameters are not known in the new SGSN (and they may also be non-applicable). XID negotiation is made for certain (most, but not all) LLC and SNDCP parameters, e.g., header compression parameters.

However, this approach is not very suitable for UMTS.
In UMTS, the PDCP is located in RNC, so negotiation will have to be made more often.
UMTS has real time bearers also for packet data.
Negotiation would be fast as possible.
Note: PDCP parameter negotiation is probably not to be named XID-negotiation, just PDCP parameter negotiation in UMTS.

Possible alternatives to make PDCP negotiation between UE and target RNC:
In the following, SRNS relocation is described in detail. All necessary information is transferred from the source RNC to the target RNC.
negotiated PDCP parameters ->target RNC, whether they are OK or not for it. If they are, new negotiation is not needed and air resources and time are saved.
UE capability information ->this includes UE's PDCP capability information among other capabilities. PDCP capability information may contain, e.g., the following information: PDCP version number and supported header compression methods and other parameters. This is not mandatory.

1) One solution is that network commands (RRC protocol in RNC), what parameters are used in the UE (in different radio layer protocols, L1, MAC; RLC, PDCP). This is not an actual two-way negotiation like XID negotiation. However the network shall know what parameters the UE is able to support (because the network can't command what the UE can't support). This UE capability can be transferred from source SRNC (suggested) or requested from the UE by 'UE capability enquiry' (see RRC specification—TS 25.331 v1.5.0: Chapters 8.1.6 and 8.1.7). Now the target SRNC can negotiate (command) new parameters for the UE. The current (prior art) solution is that the parameters are transferred within 'Radio Bearer Setup/Reconfiguration' messages (see TS 25.332: Chapter 8.2). Actual PDCP parameters should probably be named as 'PDCP Info' like 'RLC info' (see table in chapter 10.1.5.4). Also other messages (new or existing ones) are possible.

In a case where the parameters were OK in the target SRNC:
An indication is provided that previously negotiated parameters were OK. Both sides use old parameters. This indication can be one's own RRC level message or part of a 'Radio Bearer Setup/Reconfiguration'-message. This indication can be very short (1 bit), to indicate whether the negotiated parameters were OK or not.

In a case when parameters were not OK in the target SRNC:
The target RNC commands new parameters taking into consideration the UE's capability. (Normal PDCP parameter negotiation).

In this solution, there is no time saving, because negotiation is one way.

2) In this solution, PDCP parameter negotiation is two-way between the network (RNC) and the UE. In this case, UE capability information is not mandatory (but such may help the target SRNC, when it negotiates new parameters). After SRNC receives the to be negotiated parameters, it checks the suitability of the parameters.

In a case where parameters are OK in target SRNC:
An indication is provided that the previously negotiated parameters are OK. Both sides use the old parameters. This indication can be one's own RRC level message or part of a 'Radio Bearer Setup/Reconfiguration'-message. This indication can be very short (1 bit), to indicate whether negotiated parameters were OK or not.

In a case where parameters were not OK in target SRNC:
The target RNC negotiates new parameters. (Two-way PDCP parameter negotiation). First direction message (request) may be same as in solution 1), i.e., 'Radio Bearer Setup/Reconfiguration', such as in FIG. 4 or 5, and second direction message (reply) could be 'Radio Bearer Setup/Reconfiguration Complete' (see chapter 10.1.5.5). Also new (own) messages for PDCP negotiation in RRC protocol may be possible.

In this solution, time is saved, because two-way negotiation needs to be made only when parameters weren't OK.

Note: In both solutions it is assumed that the RRC makes the PDCP negotiation and after negotiation (if needed) RRC informs new parameters to PDCP. An alternative solution is that PDCP makes the negotiation by itself. Then RRC messages are not used, but PDCP uses its own PDUs for negotiation. However the basic principles are the same also in this case.

A similar approach could be used also in future releases of GPRS.

SRNS relocation principles according to 3G TS 23.121 v 3.1.0 (1999–10) 3G PP Technical Specification Group Services and Systems Aspects; Architectural Requirements for Release 1999 at Section 4.3.14.2, as modified according to the present invention:

According to Chapter 4.3.14.2.1 of 3G TS 23.121, to carry out SRNS relocation, the source SRNC must launch the SRNS relocation procedure, since it is not the target SRNC but the source SRNC that knows the current services of a user. This is done only when this procedure has the least adverse effect on user traffic. The SRNC relocation procedures must ensure that there is only one Serving RNC for a user even if this user has services through more than one (IP or ISDN) domain.

The SRNS relocation procedure is split in two phases. In the first phase resources are reserved on the new IU interfaces and (if needed) inside the CN. Only when this first phase has been successfully carried out for all domains on which the user currently has some services, can the source SRNC launch the second phase, i.e., handover of the role of SRNC to the target SRNC.

The signaling procedures shown below do not represent the complete set of possibilities, according to the TS 23.121 specification, nor do they mandate this kind of operation. It should be understood according to the standard, that a set of elementary procedures should be specified for each interface, which may be combined in different ways in an implementation. Therefore the illustrative sequences are merely examples of a typical implementation. In these examples from the 3G TS 23.121 standard, MSC stands for 3G_MSC/VLR and SGSN stands for 3G_SGSN.

SRNS Relocation (UE connected to a single CN node, 3G_SGSN) followed by Location Registration in new Location Area as per Chapter 4.3.14.2.3 of 3G TS 23.121 as modified by the present invention.

This example shows SRNS relocation when source RNC and target RNC are connected to different 3G_SGSNs. FIG. 7 and FIG. 8 respectively illustrate the situation before and after the SRNS relocation and location registration. FIG. 9 illustrates the signaling sequence where each step is explained below.

As shown in FIG. 7, before the SRNS relocation and location registration the UE is registered in SGSN1 and in MSC1. The UE is in state MM connected towards the SGSN1 and in state MM idle (see Chapter 4.3 UMTS Mobility Management (UMM) in 3G TS 23.121) towards the MSC1. The RNC1 is acting as SRNC and the RNC2 is acting as DRNC.

After the SRNS relocation and location registration as shown in FIG. 8, the UE is registered in MSC2 and in SGSN2. The UE is in state MM connected towards the SGSN2 and in state MM idle towards the MSC2. The RNC2 is acting as SRNC.

At SRNS relocation:

The source and target SGSN exchange CN level information (CN classmark, list of established PDP contexts)

The source and target SRNC exchange UTRAN level information (UTRAN classmark, . . . ) and information used to ensure that no user packet is lost nor duplicated during the SRNS relocation procedure. According to the teachings of the present invention, this UTRAN level information also includes negotiated PDCP (XID) parameters.

"Resource Reservation" Phase

Figure 9A:
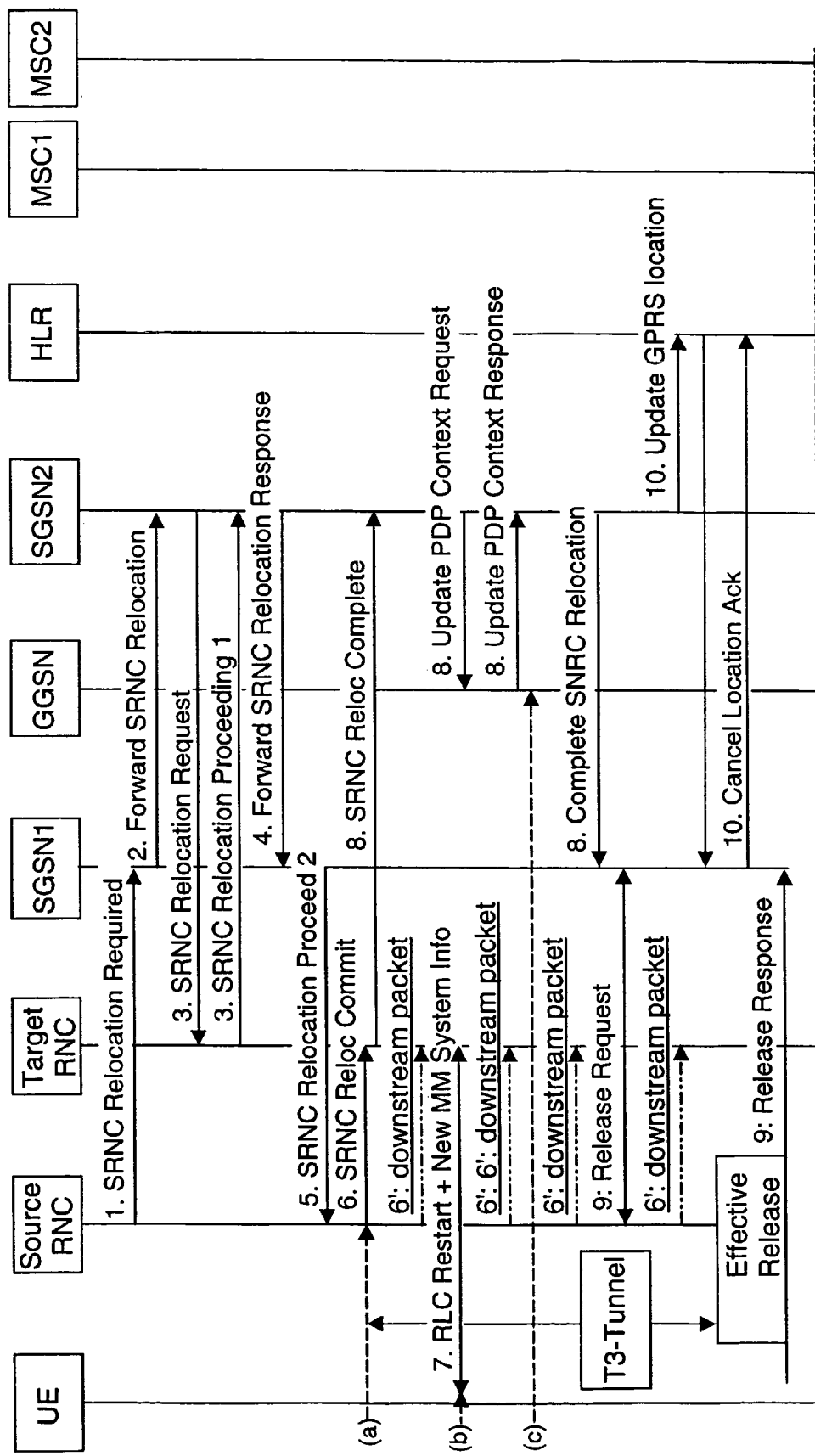

During this phase, according further to Chapter 4.3.14.2.3 of 3G TS 23.121 v 3.1.0 (1999–10), the transmission of packets between GGSN and UE through the source SRNC goes on. The following numbered paragraphs correspond to the numbered steps in FIGS. 9A and 9B, which fit together as shown in FIG. 9.

1. UTRAN (source SRNC) makes the decision to perform the Serving RNC relocation procedure. This includes a decision on into which RNC (Target RNC) the Serving RNC functionality is to be relocated. The source SRNC sends SRNC Relocation Required messages to the SGSN1. This message includes parameters such as target RNC identifier and an information field that shall be passed transparently to the target RNC. According to the present invention, this may include negotiated PDCP (XID) parameters, UE capability (e.g., supported header compression methods by UE) and any other related parameters.

2. Upon reception of SRNC Relocation required message the SGSN1 determines from the received information that the SRNC relocation will (for instance, in this case) result in a change of SGSN.

The SGSN will then send a Forward SRNC relocation request to the applicable SGSN (e.g., SGSN2) including the information received from the Source SRNC (see above PDCP (XID) parameter information according to the invention) and necessary information for the change of SGSN (e.g., MM context, PDP context). The PDP context information contains the list of the PDP context (including PDP type, requested/negotiated QoS) currently established by the UE along with the address of the associated GGSN. It does not contain any information linked with packet transmission (sequence numbers) because such information is under the responsibility of the UTRAN.

3. The SGSN2 sends a SRNC Relocation Request message to the target RNC. This message includes information for building up the SRNC context, transparently sent from Source SRNC (e.g., UE id., number of connected CN nodes, UE capability information (including the inventive information transfer relating to PDCP (XID) parameters described above), and directives for setting up Iu user plane transport bearers.

When the Iu user plane transport bearers have been established, and the target RNC completed its preparation phase, SRNC Relocation Proceeding 1 message is sent to the SGSN2, as shown in FIGS. 9A and 9B. The SRNC Relocation Proceeding 1 message contains the IP address(es) (possibly one address per PDP context) on which the target RNC is willing to receive these packets.

4. When the traffic resources between target RNC and SGSN2 has been allocated and the SGSN2 is ready for the SRNC move, then the Forward SRNC Relocation Response is sent from SGSN2 to SGSN1. This message indicates that necessary resources have been allocated for the SRNC relocation: SGSN2/target RNC are ready to receive from source SRNC the downstream packets not yet acknowledged by UE. The Forward SRNC Relocation Response message contains the IP address(es) that were given in the SRNC Relocation Proceeding 1 message.

5. When the Forward SRNC Relocation Response has been received in the SGSN1, the SGSN1 indicates the completion of preparation phase at the CN PS domain side for the SRNC relocation by sending the SRNC Relocation Proceeding 2 message to the Source RNC. This message contains the IP address(es) (possibly one address per PDP context) on which to send the downstream packets not yet acknowledged by UE.

"Actual Hand-Over of Serving RNC" Phase

6. When the source RNC has received the SRNC Relocation Proceeding 2 message, the source RNC sends a SRNC Relocation Commit message to the target RNC (list of (SNU, UP_RLC_Ack, SND)). SND is the GTP sequence number for the next downlink packet received from the GGSN. SNU is the GTP sequence number for the next uplink packet to be tunnelled to the GGSN. UP_RLC_Ack contains the acknowledgements for an upstream PDU received by the source SRNC on each RLC connection used by the UE (i.e., the Receive State Variable V(R) for all RLC SAPI in the acknowledged mode). The source SRNC starts a timer T3-TUNNEL, stops the exchange of the packets with the UE (point (a)), and starts tunnelling the buffered downstream packets towards the target SRNC. The target RNC executes a switch for all bearers at the earliest suitable time instance. In this phase, according to the present invention, new PDCP parameters are to be negotiated if needed. See the description above concerning possible alternatives for PDCP negotiation between the UE and the RNC.

7. The target RNC starts acting as SRNC and the remaining steps 7–14 of Chapter 4.3.14.2.3 of 3G TS 23.121 v 3.1.0 (1999–10) remain the same and are unaffected by the present invention. The target SRNC:
   (a) Restarts the RLC connections. This includes the exchange between the target SRNC and the UE of the UP_RLC_Ack and DOWN_RLC_ACK. DOWN_RLC_ACK confirms all mobile-terminated packets successfully transferred before the start of the relocation procedure. If DOWN_RLC_ACK confirms reception of packets that were forwarded from the source SRNC, then these packets shall be discarded by the target SRNC. UP_RLC_Ack confirms all mobile-originated packets successfully transferred before the start of the relocation procedure. From now on the exchange of the packets with the UE can restart (point (b)).
   (b) Sends New MM System Information to the UE indicating, e.g., relevant Routing Area and Location Area. A new RAI triggers a routing area update procedure. Additional RRC information may then also be sent to the UE, e.g., new RNTI identity. This may trigger a location update procedure (see step 12 below).

8. Immediately after a successful switch at RNC, target RNC (=SRNC) sends SRNC Relocation Detect message to the SGSN2. After sending out the New MM System Information, the target RNC sends SRNC Relocation Complete message to the SGSN2.

9. The UE sends a Routing area update request (old RAI; old P-TMSI; old PTMSI signature, Update type) to SGSN2 when the New MM System Information included a new RAI.

10. Upon reception of RAU request, the SGSN2 updates the GGSN(s) with an Update PDP Context Request including the new SGSN address. The GGSN(s) then update the PDP context and return Update PDP Context Response. The SGSN sends a Complete SRNC Relocation towards the SGSN1.

11. At reception of the Complete SRNC Relocation, SGSN1 will send a release indication towards the Source RNC. All resources allocated to this UE by the source RNC are released only when this message has been received and timer T3-TUNNEL has expired. Before timer T3-TUNNEL expires, all downstream packets received from the GGSN are sent towards the target SRNC.

12. The SGSN2 informs the HLR of the change of SGSN by sending Update GPRS location (IMSI, new SGSN address etc.) to the HLR. The HLR cancels the context in the old SGSN, SGSN1, by sending Cancel Location (IMSI). The SGSN1 removes the context and acknowledges with Cancel Location Ack. The HLR sends Insert subscriber data (IMSI, subscription data) to the SGSN2. The SGSN2 acknowledges with Insert Subscriber Data Ack. The HLR acknowledges the Update GPRS location by sending Update GPRS Location Ack to the SGSN2.

13. At reception of Insert subscriber data from HLR, the SGSN2 will initiate the update of MM information stored in the UE. This is done by sending Network Initiated Routing Area Update Command to the UE. This message will include new RAI, and possible also new P-TMSI. When the UE has made necessary updates it answers with Network Initiated Routing Area Update Complete.

14. When receiving new MM system information indicating a new Location Area, the UE will, in this case, initiate a Location Area update procedure towards the MSC2. This implies that the Location Area update will be performed in parallel to the above indicated activities related to the SGSN side of the Core Network.

UE-GGSN Communication Path During the SRNS Relocation Procedure

Figure 10:
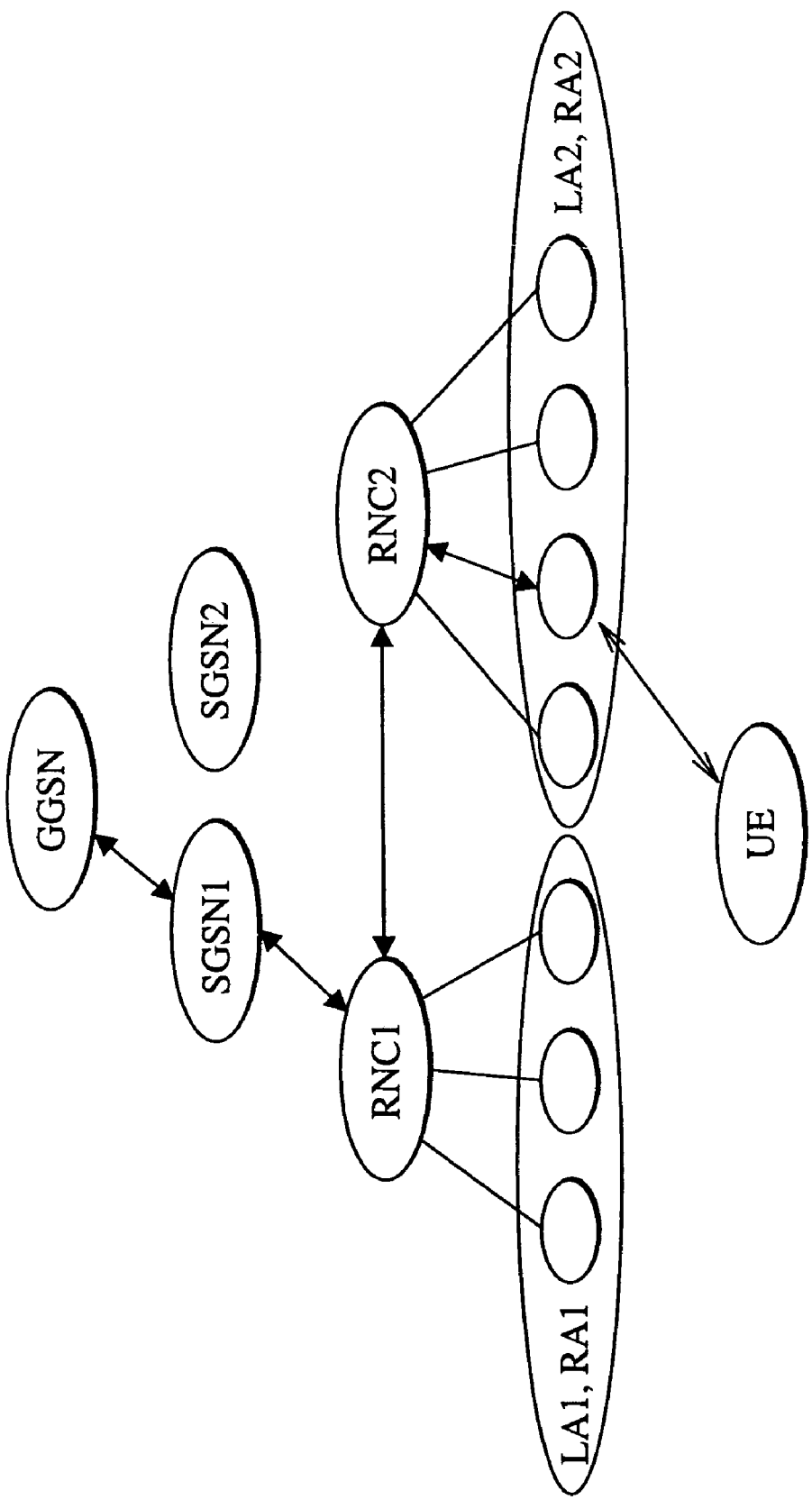
FIG. 10 shows data paths before the SRNS relocation has been actually committed.

Before point (a), in FIG. 9A, the connection is established between UE and GGSN via Source SRNC and SGSN1, as shown in FIG. 10 (FIGS. 4–28 of 3G TS 23.121 v 3.1.0).

After transmission of the "SRNS relocation commit" to the target SRNC (after point (a) in FIG. 9A, the source RNC cannot exchange data with the UE because its RLC should be frozen after the transmission of the RLC sequence numbers to the target RNC. Before the restart of the RLC between target SRNC and UE (before point (b) in FIG. 9A), data transfer cannot go on. All downstream packets received by the target SRNC during this phase are buffered until restart of the RLC between target SRNC and UE.

After point (c), in FIG. 9A, the connection is established between UE and GGSN via Target RNC and SGSN2.

Before resource release in source RNC (before T3-TUNNEL expiry), target SRNC may receive downstream packet from two paths. Packets remaining on the backbone are sent on the "old path" (via SGSN1 and RNC1) and forwarded by source RNC1 to target SRNC2 while packets received by the GGSN on its Gi interface are sent on the new path (via SGSN2) to target SRNC2.

Figure 11:
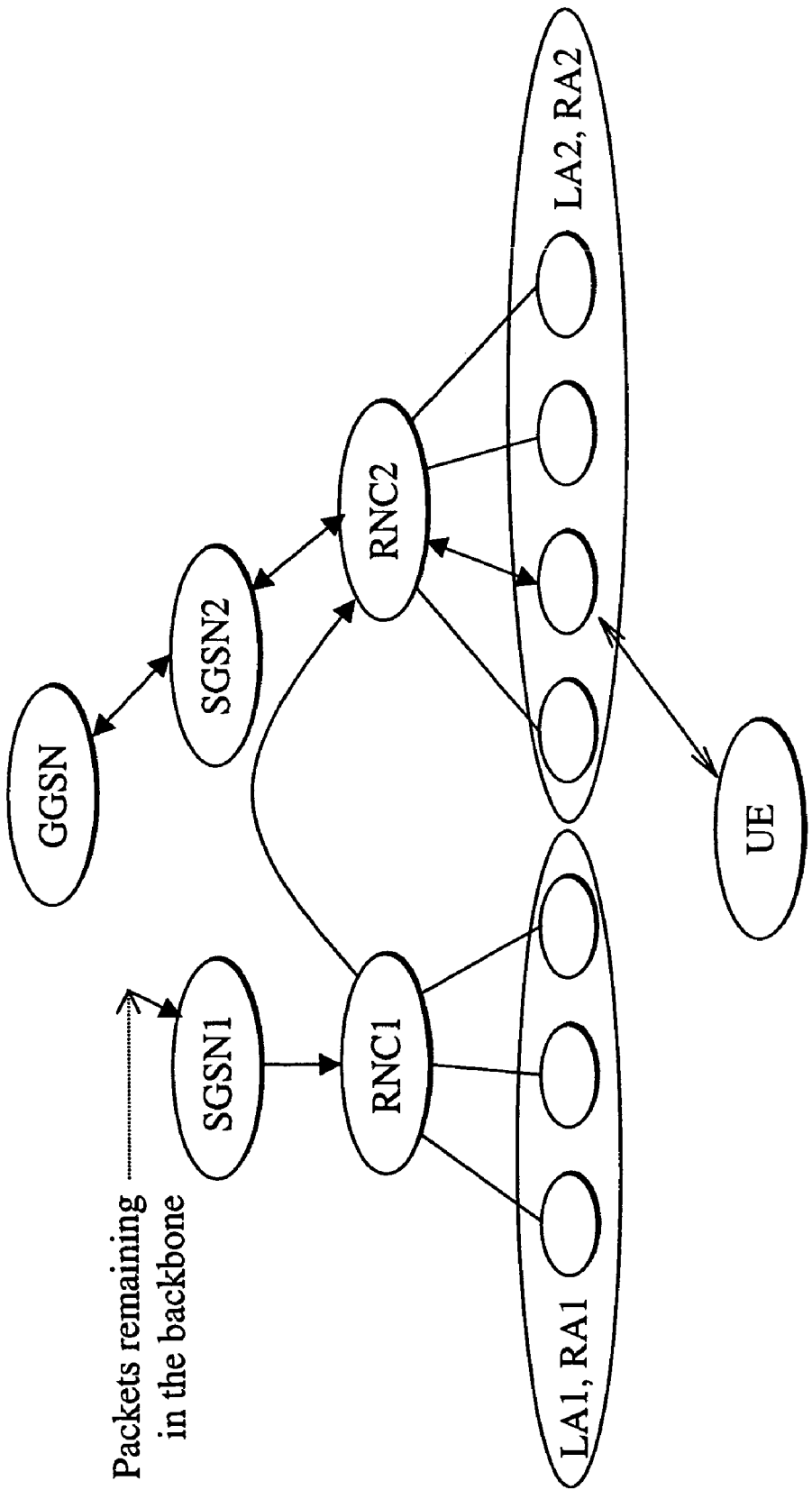
FIG. 11 shows data paths after the GGSN update.

FIG. 11 shows data paths after the GGSN update (after point (c) in FIG. 9A).

Figure 12:
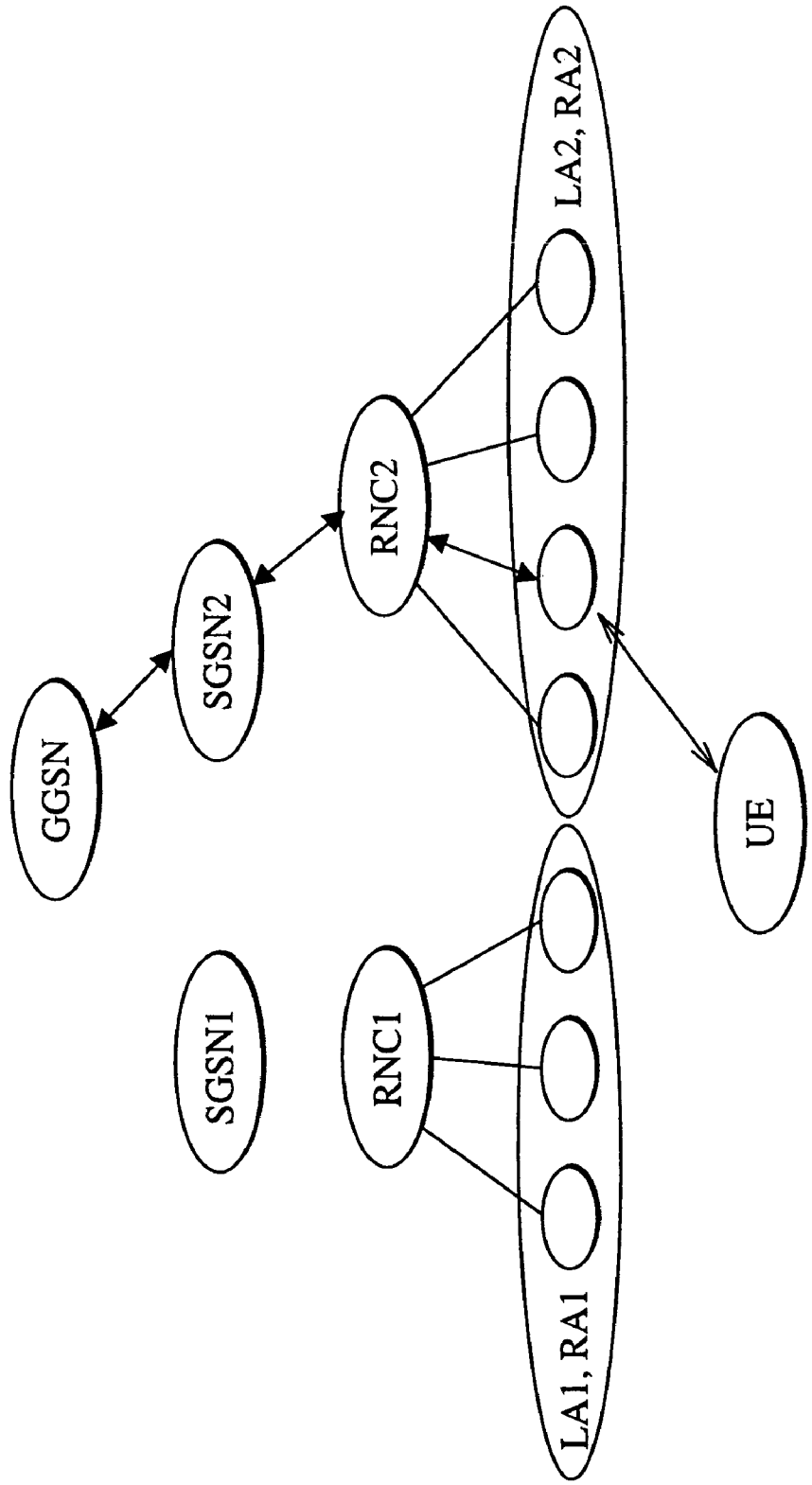
FIG. 12 shows data paths after the resource release in the source RNC.
Figure 13:
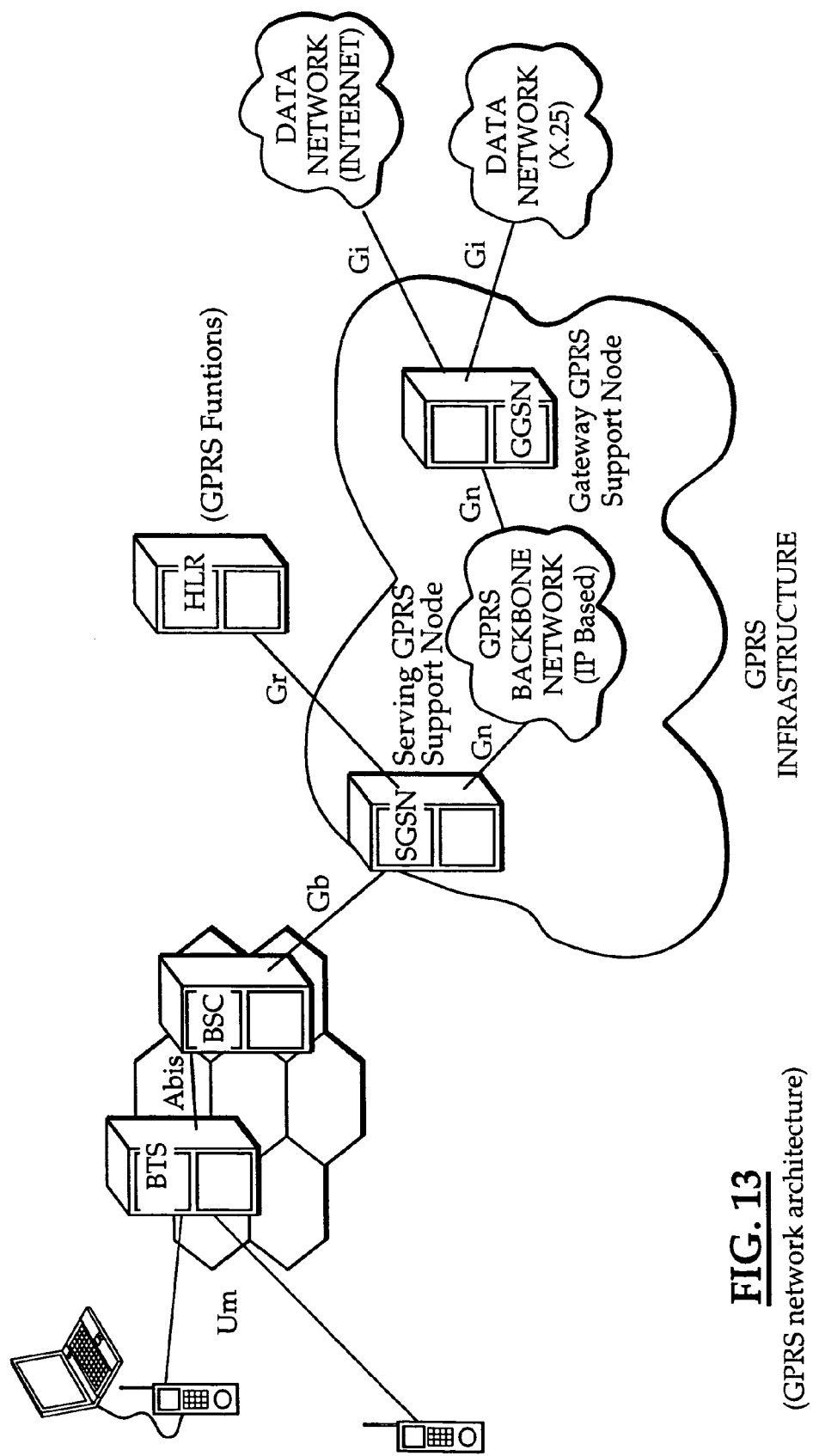
FIG. 13 shows the GPRS network architecture.

FIG. 12 shows data paths after the resource release in source RNC (after the release response in FIG. 9A).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method of negotiating parameters of an optimization algorithm during connection handover of a mobile station between radio network subsystems, comprising the steps of:

signaling from a source radio network subsystem to a core network or to a target radio network subsystem that said handover is required;

signaling from the core network or from the target radio network subsystem to the source radio network subsystem that said handover is to proceed; and transmitting said parameters from said source radio network subsystem to said target radio network subsystem directly or via the core network without any need for renegotiating said parameters over an air interface between said mobile station and said target radio network subsystem.

2. The method of claim 1, wherein during initial establishment of said connection between the mobile station and the source radio network subsystem, the parameters may include various optional sets of parameters, only one of which is accepted by the source radio network subsystem, said method further comprising the step of storing all of said optional sets of parameters wherein said step of transmitting said parameter includes transmitting all of said optional sets of parameters.

3. Mobile telecommunications system including a core network (14) connected (Iu) to plural interconnected (Iur) radio network subsystems (11, 12) for communicating with a mobile station (10) over an air interface (Uu), wherein a first one of said radio network subsystems (11) includes a source radio network controller (16) for signaling to said core network or to a target radio network controller (20) in a second one of said radio network subsystems (12) that a handover is required wherein a response thereto said core network or said target radio network subsystem signals the source radio network controller that said handover is to proceed, and wherein parameters are then transmitted from said source radio network controller to said target radio network controller directly or via the core network without any need for renegotiating said parameters over said air interface between said mobile station and said target radio network controller.

4. The system of claim 3, wherein during an initial negotiation of said parameters between the mobile station and the source radio network controller, said parameters include various optional sets of parameters, only one of which is accepted by the source radio network controller, wherein said various optional sets of parameters are stored by said source radio network controller for transmittal to said target radio network controller after said source radio network controller signals said target audio network controller that said handover is to proceed.

5. A radio network subsystem (11) for communicating with a mobile station (10) over an air interface (UU), comprising a source radio network controller (16) for signaling to a core network (14) or to a target radio network controller (20) that a handover is required wherein in response thereto said core network or said target radio network subsystem signals the source radio network controller that said handover is to proceed, said radio network subsystem further comprising means for transmitting algorithm parameters from said source radio network controller to said target radio network controller directly or via the core network without any need for renegotiating said parameters over said air interface between said mobile station and said target radio network controller.

6. The radio network subsystem (11) of claim 5, wherein said source radio network subsystem negotiated said parameters with the mobile station prior to said handover and said parameters include communication protocol parameters between said mobile station and said radio network subsystems.

7. The radio network subsystem of claim 5, wherein during an initial negotiation of said parameters between the mobile station and the source radio network controller, said parameters include various optional sets of parameters, only one of which is accepted by the source radio network controller, wherein said various optional sets of parameters are stored by said source radio network controller for transmittal to said target radio network controller after said source radio network controller signals said target radio network controller that said handover is to proceed.

8. A mobile station (10) comprising means for communication with a radio network subsystem (11) for negotiating parameters over an air interface (UU), wherein said radio network subsystem (11) comprising a source radio network controller (16) for signaling to a core network (14) or to a target radio network controller (20) that a handover is required wherein in response thereto said core network or said target radio network subsystem signals the source radio network controller that said handover is to proceed, said radio network subsystem further comprising means for transmitting algorithm parameters from said source radio network controller to said target radio network controller directly or via the core network without any need for renegotiating said parameters over said air interface between said mobile station and said target radio network controller.

9. The mobile station (10) of claim 5, wherein said source radio network subsystem negotiated said parameters with the mobile station prior to said handover and said parameters include communication protocol parameters between said mobile station and said radio network subsystems.

10. The radio network subsystem of claim 8, wherein during an initial negotiation of said parameters between the mobile station and the source radio network controller, said parameters include various optional sets of parameters, only one of which is accepted by the source radio network controller, wherein said various optional sets of parameters are stored by said source radio network controller for transmittal to said target radio network controller after said source radio network controller signals said target radio network controller that said handover is to proceed.

11. The method of claim 1, wherein said source radio network subsystem negotiated said parameters with the mobile station prior to said handover and said parameters include communication protocol parameters between said mobile station and said radio network subsystems.

12. The system of claim 3, wherein said source radio network subsystem negotiated said parameters with the mobile station prior to said handover and said parameters include communication protocol parameters between said mobile station and said radio network subsystems.

13. The method according to claim 1, wherein said parameters result from exchange identification (XID) negotiations.

14. The method according to claim 13, wherein said exchange identification (XID) negotiations are carried out by a packet data convergence protocol (PDCP).

15. The system according to claim 3, wherein said parameters result from exchange identification (XID) negotiations.

16. The system according to claim 15, wherein said exchange identification (XID) negotiations are carried out by a packet data convergence protocol (PDCP).

17. The method according to claim 1, wherein said parameters include header compression (HC).

18. The mobile telecommunications system according to claim 3, wherein said parameters include header compression (HC).

19. The radio network subsystem according to claim 5, wherein said parameters result from exchange identification (XID) negotiations and optionally said exchange identification (XID) negotiations are carried out by a packet data convergence protocol (PDCP).

20. The radio network subsystem according to claim 5, wherein said parameters include header compression (HC).

* * * * *